AERIAL SURVEY SYSTEM

Filed Oct. 11, 1950 5 Sheets-Sheet 1

INVENTOR.
JACOB H. WIENS,
BY Reed C. Lawlor
ATTORNEY.

INVENTOR.
JACOB H. WIENS,
BY Reed C. Lawlor
ATTORNEY.

INVENTOR.
JACOB H. WIENS,
BY Reed C. Lawlor
ATTORNEY

INVENTOR.
JACOB H. WIENS,
BY Reed C. Lawlor
ATTORNEY.

INVENTOR.
JACOB H. WIENS,
BY Reed C. Lawlor
ATTORNEY

United States Patent Office 2,798,116

Patented July 2, 1957

2,798,116

AERIAL SURVEY SYSTEM

Jacob H. Wiens, Redwood City, Calif., assignor of thirty percent to Reed C. Lawlor, Alhambra, Calif.

Application October 11, 1950, Serial No. 189,614

8 Claims. (Cl. 178—6.7)

My invention relates to surveying systems and more particularly to systems for surveying terrain from the air by employing television techniques. While my invention has application to other types of surveying systems, it is described below primarily with particular reference to aerial surveying.

In one well-known system that is employed for surveying from the air, photographs of the ground are taken intermittently by means of a camera borne by an airplane as the plane is flying over the area to be surveyed. That system of aerial surveying is very satisfactory for mapping purposes where there is little danger of loss of the airplane and where there is no disadvantage in the delay in making the information recorded on the photographs available at a home, or base station. However, because of the disadvantage of such delay and the dangers of such loss, such photographic techniques of surveying are unsuitable for military purposes.

In order to make the results of an aerial survey available immediately at a home base, television systems have been employed. In these systems, television images of the area surveyed have been transmitted from an aircraft to a receiver at a ground station, thus making information respecting the area surveyed available for immediate use. Such television systems have been the usual type employed for broadcast purposes in which, for example, 30 frames, each containing about 500 picture lines, are transmitted per second. For optimum definition of the images viewed, the transmission of picture signals representing the scene by such methods has required the employment of a frequency band width of about 4.5 megacycles, even when employing only a single side-band. Though the use of such a television system makes information regarding the scene surveyed available immediately, it suffers from the disadvantage that the images received are lacking in detail. Another disadvantage of employing such system is that it requires the use of heavy complex electronic equipment at the transmitter.

An object of my invention is to provide an improved television surveying system which provides increased definition per cycle of band-width.

Another object of my invention is to provide a television surveying system of increased simplicity and reduced weight.

Another object of my invention is to provide a television surveying system in which an image of the area surveyed is repeatedly scanned along a single line in one direction, while the image of the area surveyed travels across the image area in a transverse direction.

Another object of my invention is to provide a single-line television surveying system which produces an accurately proportioned image at the receiver irrespective of changes in the velocity of the aircraft upon which the transmitter is carried.

A still further object of my invention is to provide a television surveying system with a simple, light weight control circuit for synchronizing the operation of the reproducer at the receiver with the scanning at the transmitter.

My invention possesses numerous objects and features of advantage, some of which, together with the foregoing, will be set forth in the following description of specific apparatus embodying and utilizing my novel method. It is, therefore, to be understood that my method is applicable to other apparatus and that I do not limit myself in any way to the apparatus of the present specification, as I may adopt various other apparatus embodiments utilizing the principles of my invention within the scope of the appended claims.

In the surveying system of this invention, an image of the area surveyed is formed in an image area, and the portion of the image along a fixed line of the image area is repeatedly scanned as the image moves across the area in a direction transverse to that line. As the portion of the image along the scanning line is scanned, it is converted into an electrical picture wave which is employed to modulate a transmitter. The modulated wave emitted by the transmitter is received at a remote point and is there employed to reconstruct an image of the area surveyed upon an image reproducer, such as a facsimile recorder.

The progression of the image across the image area may be effected in several different ways without departing from the principles of this invention. When my single-line scanning system is applied to aerial reconnaissance surveying, the scanning system may be mounted directly upon the aircraft with its optical axis pointed downwardly. In this case, the scanning system may be arranged with the scanning line transverse to the longitudinal axis of the aircraft, or transverse to the direction of flight, as may be desired. Then as the aircraft flies over the area, successive segments of the area are scanned and corresponding electrical picture waves produced. When my invention is applied to simple searching from the air, the optic axis of the scanning system is directed toward the area under observation and moved transversely to the scanning line so as to cause an image of the area being observed to cross the image area transversely to the scanning line. It is thus apparent that my invention may be employed in numerous ways, even though in the following description it is described primarily with reference to aerial surveying from aircraft.

Figure 1:
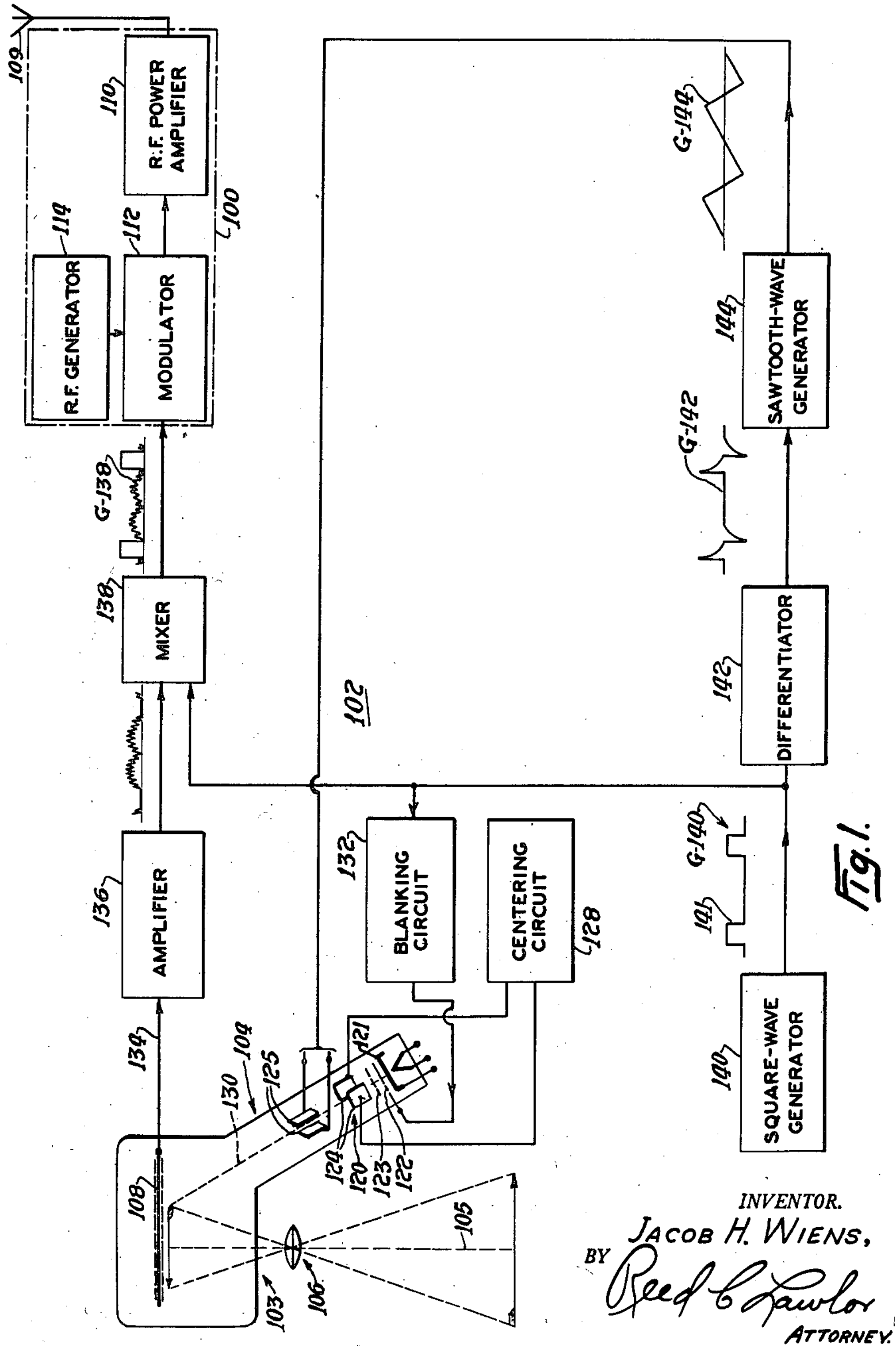
Fig. 1 is a schematic diagram of a transmitter employed in my television surveying system.
Figure 2:
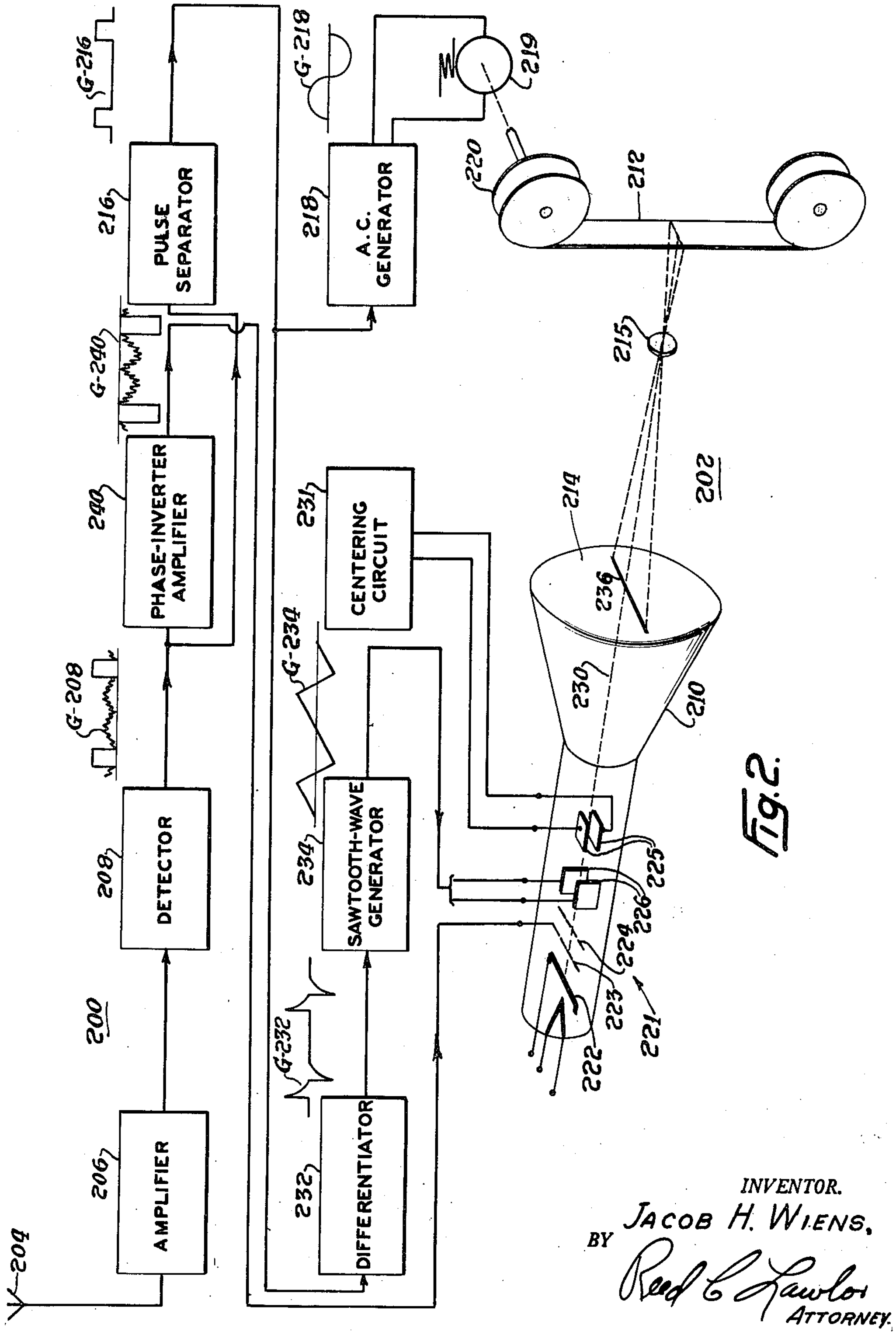
Fig. 2 is a schematic wiring diagram of a receiver.

In the reconnaissance surveying system for use with aircraft illustrated in Figs. 1 and 2, a transmitter 100 is mounted upon the aircraft and a receiver 200 is located at a home, or base, station on the ground. A scanning system 102 employed for modulating the radio frequency carrier wave emitted by the transmitter 100 is also mounted upon the aircraft. An image reproducer 202, here represented by a facsimile recorder, is also mounted at the base station and is operated by the receiver 200 in synchronism with the scanning of the area surveyed at the transmitter.

The scanning system 102 comprises an imaging system 103, such as an iconoscope 104, or other camera tube, and an optical system 106, together with associated electrical equipment for modulating the output of the transmitter 100 in accordance with electrical picture waves. The transmitter 100 comprises an antenna 109 which is fed by a radio frequency power amplifier 110 which amplifies the output of a modulator 112 in which a carrier wave of radio frequency generated by a radio frequency generator 114 is modulated by the picture signals supplied from the scanning system 102.

The imaging system 103 is mounted on the aircraft with its optic axis 105 vertical so that an image of the terrain over which the aircraft is flying is focused upon an image area of a mosaic of photo-sensitive elements forming a light-sensitive screen 108 of the iconoscope 104. The iconoscope 104 includes an electrode system 120 including a cathode 121, a control grid 122, a focusing electrode 123, a pair of centering plates 124, and a pair of scanning plates 125, all arranged in sequence along the axis of a stem 126 at one side thereof. The two pairs of plates 124 and 125 are arranged to produce electric deflection forces at right angles to each other.

An electron beam 130 accelerated in conventional manner is projected from the cathode 121 past the control grid 122 and focusing electrode 123 and between the opposite members of the pairs of plates 124 and 125 to the mosaic screen 108. According to my invention a steady centering voltage supplied from a centering circuit 128 is impressed upon the centering plates 124 while a periodic sawtooth-wave voltage is applied to the scanning plates 125 to cause the electron beam 130 to sweep back and forth across the mosaic screen 108 along a scanning line which is at right angles to the longitudinal axis of the aircraft upon which the scanning system 102 is mounted. A blanking signal is supplied from the blanking circuit 132 to the control grid 122 in synchronism with the application of the sawtooth-wave voltage to the scanning plates 125 in order to suppress the electron beam 130 upon its return sweep across the screen 108. As the electron beam 130 sweeps across the screen 108 in the opposite direction, electrical charges are successively released from the photo-sensitive elements at the points of impingement in accordance with the intensity of light falling thereon, so as to produce a fluctuating electrical picture wave at the output electrode 134 of the iconoscope representative of the fluctuations of intensity of light impinging upon various portions of the scanning line.

Thus, the screen 108 is repeatedly scanned along a fixed line in a direction extending from one end thereof to the other so as to produce a series of electrical picture waves. The picture waves correspond to the distribution of light appearing along successive parallel lines of the terrain transverse to the course of flight. As the picture waves appear at the output electrode 134, they are amplified by an amplifier 136 and the amplified output is impressed upon a mixing circuit 138 where it is combined with square waves as explained more fully hereinbelow. The combined output from the mixing circuit is then impressed upon the modulator 112 to modulate the carrier wave generated by the generator 114.

The scanning system 102 employs a square-wave generator 140 to control the generation of the sawtooth-wave scanning voltages and to provide the blanking signals. The square-wave generator 140 may be of any suitable type for generating square waves 141 of short duration periodically as indicated in the graph G140. In this graph, as in all others of Figs. 1 and 2, ordinates represent voltages and abscissae represent time, positive changes of voltage being usually upward and negative changes being usually downward but time invariably progressing from left to right. For convenience in coordinating the graphs of Figs. 1 and 2, they are all drawn to the same time scale.

The output of the square-wave generator 140 passes through a differentiating circuit 142 to produce a voltage wave of the shape indicated in graph G142 having a sharp peak where each square wave 141 begins and ends. This voltage wave G142 is employed to excite a sawtooth-wave generator 144 which is designed to produce an asymmetrical sawtooth-wave voltage as indicated in graph G144. Here it will be noted that the output of the sawtooth-wave generator comprises a periodic voltage wave which changes relatively slowly in a positive direction while the output of the square-wave generator 140 is zero, and a portion which changes relatively rapidly in a negative direction while the output of the square-wave generator 140 is positive.

The output of the sawtooth-wave generator 144 is applied directly to the scanning plates 125, causing the electron beam 130 to move forwardly in one direction along the scanning line while the sawtooth-wave scanning voltage is increasing relatively slowly and to return in the opposite direction while the scanning voltage is decreasing relatively rapidly, the time of return being small compared with the time required to traverse the scanning line. To complete the control of the scanning, the output of the square-wave generator 140 is applied through a phase inverting blanking circuit 132 to the control grid 122. Thus, the control grid 122 serves to permit an electron beam 130 of fixed intensity to strike the screen 108 while the sawtooth-wave voltage is increasing and to cut off or suppress the electron beam 130 while the sawtooth wave voltage is decreasing. Thus, the electron beam 130 repeatedly sweeps along a fixed line on the screen 108 relatively slowly and then quickly returns to its starting position. As a result of the suppression of the electron beam 130 on the return sweeps, the successive picture waves generated on the forward sweeps are separated by blanks of the same duration as the square waves 141.

As the series of electrical picture signals so generated by the iconoscope 104 is being generated, square waves from the square-wave generator 140, as well as the picture signals, are impressed upon the mixing circuit 138 so as to produce a combined signal represented in the graph G138 wherein the electrical picture waves alternate with square waves. In order to facilitate synchronization at the receiver, the amplitude of the square wave pulses is preferably greater than the amplitude of any of the intervening picture signals. With this arrangement, if amplitude modulation is employed, the radio wave emitted by the antenna 108 comprises a carrier wave modulated with an envelope having the shape of the combined wave G138. If a frequency modulated transmitter is employed, the frequency of the radio wave emitted is modulated in a corresponding manner.

Referring now to Fig. 2, the modulated wave arriving at the receiver 200 is picked up by a receiving antenna 204 and amplified in a suitable radio-frequency amplifier 206, and the amplified wave is rectified by means of a detector 208 in order to reconstruct the combined picture signal G138 as indicated at the output of the detector by the graph G208. The output of the detector 208 is impressed upon a facsimile recorder 202 or other image reproducer in order to reconstruct the image of the terrain over which the aircraft is flying.

The facsimile recorder 202 employs a cathode ray tube 210 operated in synchronism with the scanning system 102 to reproduce the line images scanned in the iconoscope tube 104. The images formed on the screen 214 of the cathode ray tube 210 are focused by a lens 215 upon a film 212 as the film is moved along its length past the focal plane of the lens. To drive the film 212, the output of the detector 208 is impressed upon a pulse separator 216 where the picture signals are suppressed and the square waves transmitted to the output, thus producing a square-wave output voltage represented by the graph G216. This output voltage is impressed upon an alternating current generator 218 to cause the generator to produce a sinusoidal output voltage represented by the graph G218 of the same frequency as the frequency of recurrence of the square wave G216, or if desired some frequency related thereto by a constant proportion. The power supplied from the A. C. generator is employed to operate a synchronous motor 219 that drives a drum 220 that advantages the film 212 at a constant speed.

The cathode ray tube comprises an electrode system 221 including a cathode 222, a control grid 223, a focusing electrode 224, a pair of centering plates 225, and a pair of scanning plates 226. The two pairs of plates 225 and 226 are arranged at right angles to each other. An electron beam 230 is accelerated in the conventional manner toward the cathode ray screen 214 where it causes the screen to become illuminated at the point of impingement in accordance with the intensity of the electron beam 230.

To scan the cathode ray screen 214 along a fixed reproducing line 236 a steady voltage is applied from the centering circuit 231 to the centering plates 225. Also the output of the pulse generator 216 is passed through a differentiator 232 to the input of a sawtooth-wave generator 234 to produce sawtooth scanning wave voltage represented by the graph G234 of the same shape as the sawtooth waves G144 produced in the scanning system 102. The sawtooth wave voltage G234 is applied to the scanning plates 226 to cause the electron beam 230 to sweep relatively slowly in one direction along the reproduction line 236 as the sawtooth wave voltage is increasing relatively slowly and to sweep rapidly in a return direction along that line as the sawtooth wave voltage is decreasing relatively rapidly.

The output of the detector 208 is also amplified and inverted by means of a phase-inverting amplifier 240 and then impressed upon the control grid 223. By suitably biasing the cathode 222, the beam 230 is cut off or suppressed while the square wave portions of the amplified signal represented in the graph G240 are applied to the control grid 223 and the intensity of the electron beam 230 varies in accordance with the strength of the electrical picture waves impressed thereon during the intervening intervals. In other words, the intensity of the electron beam 230 varies with the intensity of the picture wave as the electron beam 230 moves slowly in one direction across the screen 214 and the electron beam 230 is suppressed while it is returning to its starting position. Thus, the line image being scanned at the iconoscope screen 108 is periodically reproduced simultaneously along the reproduction line 236 on the cathode ray tube screen 214.

As the image of the terrain is repeatedly reproduced along the reproduction line 236, it is focused by means of the lens 215 upon the advancing film 212, thus causing the image of the terrain to be reproduced upon the film 212. The image so reproduced may be either a positive or a negative image, depending in part upon whether the number of stages in the amplifier 136 is even or odd. If desired, suitable circuits may be provided at the receiver for causing a reversal of polarity of the picture signals relative to the square waves before impressing them upon the control grid 223 in order to obtain a reversal of this photographic effect.

The film 212 upon which an image of the terrain is reproduced as above described is then developed either by a manual process or by means of automatic developing equipment in order to make available to an observer at the receiving station information regarding the terrain. Even though there is a slight delay in making that information available because of the time required for development, nevertheless my system of making information available at a home base is relatively rapid compared to aerial photography.

My system possesses the advantage over ordinary television systems in that the width of the side-bands required to achieve a given resolving power, that is, a given degree of definition of or detail in the resulting received image, is greatly reduced, and also the advantage that the use of a single series of recurring pulses, such as those produced by the square-wave generator 140 to control the synchronization of the image reproduction with the scanning is relatively simple and of relatively low weight. With my system the picture wave along a given line need only be transmitted and reproduced once instead of repeatedly as in ordinary television systems and the picture detail may be transmitted at a slower rate. Thus, for a given amount of image detail my system may employ a relatively narrow side band. For example, if I scan the image along the scanning line sixty times per second and employ a side band of only about 15 kilocycles per sec., definition comparable to that obtained with ordinary 500 lines per frame, 30 frames per second, television is obtained. By employing a wider side band of say 60 to 100 kilocycles per sec. even greater definition is obtained. For a given scanning frequency and side-band width, the definition may be further improved by employing color television techniques.

In order to compensate for fluctuation of the speed of the aircraft, I vary the frequency of the square wave generator in proportion to the flight speed. At the same time, I scan the image of the terrain formed at the screen 108 over a predetermined length thereof to survey a strip of terrain of uniform width. In this way, I am able to reproduce on the film 212 an accurate picture of the terrain over which the aircraft is flying to a uniform scale and with uniform definition irrespective of variations in the velocity of the aircraft. This uniformty is achieved in part by virtue of the fact that the synchronous motor 219 and hence the film 212 are driven automatically at a speed proportional to the flight speed.

Figure 3:
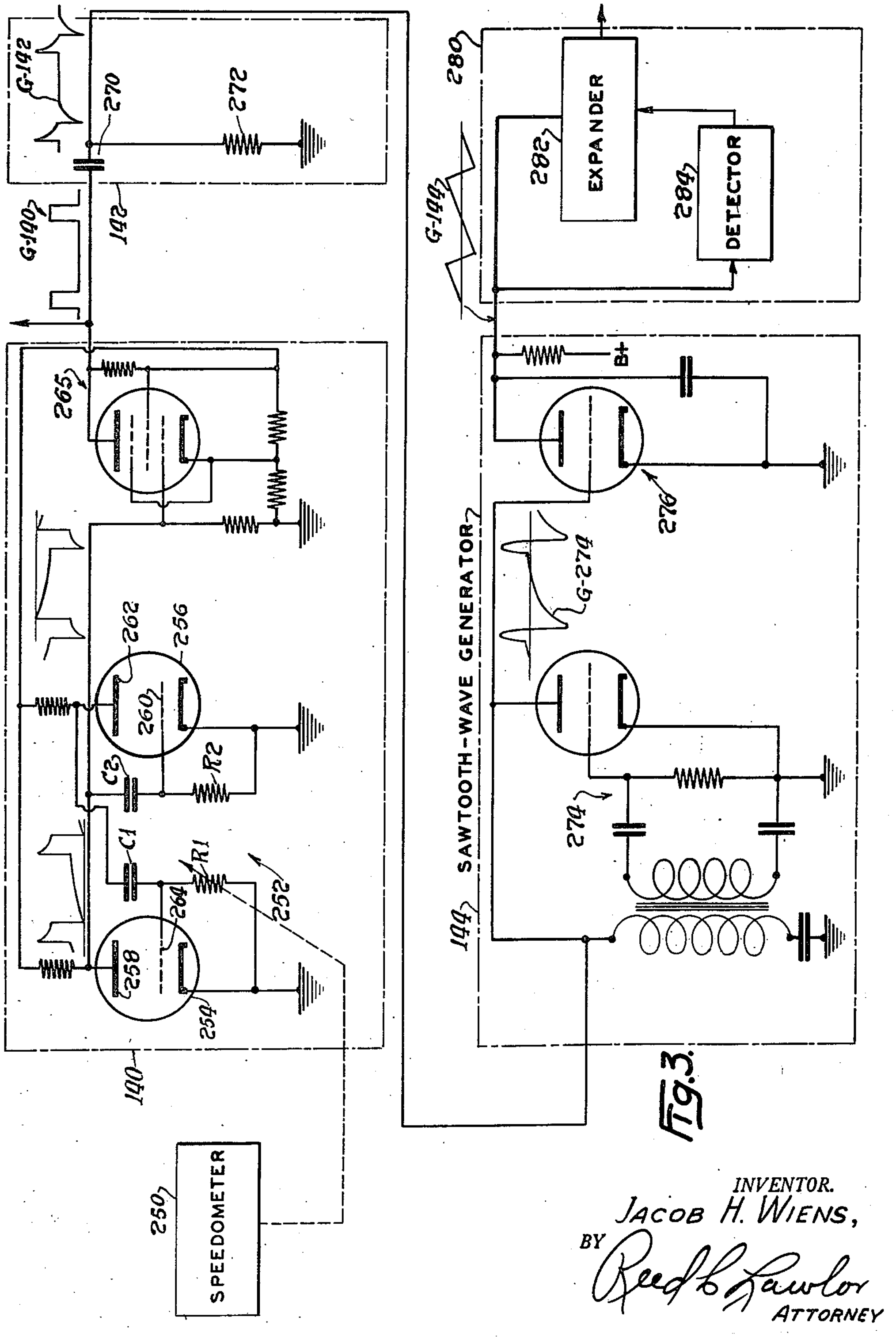
Fig. 3 is a partially schematic, partially detailed diagram of a part of a transmitter.

A system for scanning the screen 108 at a frequency proportional to the flight speed is illustrated in Fig. 3. To vary the frequency of the square wave generator 140 automatically in proportion to the speed of the aircraft, a frequency controlling element of the square-wave generator 140 is coupled to a speedometer 250. Thus, for example, in Fig. 3, the square wave generator 140 employs an asymmetric multivibrator 252 and the frequency of vibration of the multivibrator is controlled by the speedometer 250.

The multivibrator 252 comprises a pair of amplifier tubes 254 and 256. The anode 258 of the first amplifier tube 254 is coupled to the grid 260 of the second amplifier tube 256 by means of a condenser $C_2$ and a resistor $R_2$ and the anode 262 of the second amplifier tube 256 is coupled to the grid 264 of the first amplifier tube 254 by means of a condenser $C_1$ and a resistor $R_1$. The time-constant of the first coupling circuit, including the condenser $C_1$ and the resistor $R_1$, is large compared to the time-constant of the second coupling network, including the condenser $C_2$ and $R_2$, the time-constant satisfying the following relationship $$R_1C_1 \qquad R_2C_2$$

With this arrangement the multivibrator produces short pulses of a duration controlled primarily by the time-constant $R_2C_2$ separated by relatively long intervals controlled by the time-constant $R_1C_1$. To vary the frequency of generation of square waves the value of the resistor $R_1$ is varied by means of the speedometer 250 as an inverse function of the flight speed. The voltage appearing at the anode 262 of the second amplifier tube 256 is passed through a clipper circuit 265 to produce the desired square wave at the output of the square wave generator 140.

The square wave G140 of variable frequency is passed through a differentiator circuit 142 comprising a series condenser 270 and a shunt resistor 272 and the differentiated signal is applied to the sawtooth-wave generator 144 in order to produce a sawtooth wave G144 of the same frequency as the square wave G140. To achieve this result the output of the differentiator 142 is impressed upon the grid circuit of an over-damped or blocked oscillator 274 that produces a wave having a sharp positive pulse and a long negative pulse, as indicated in the graph G274. The wave G274 is applied to the grid circuit of a sawtooth-wave-forming circuit 276 which thereupon produces a sawtooth-wave voltage G144 of the same frequency as the square wave voltage G140.

The sawtooth-wave G144 is then transmitted through an amplifier 280 provided with an automatic volume control, so as to produce a sawtooth wave voltage of constant amplitude which is then applied to the scanning plates 125 of the iconoscope 104. The AVC amplifier 280 may be either of the forward-feeding or the backward-feeding type. However, an AVC system of the forward-feeding type is preferred because it is subject to more accurate output control. Thus, the amplifier 280 may comprise an expander 282 whose amplification is controlled by means of a detector 284 producing an output voltage in proportion to the amplitude of the input sawtooth wave G144 to produce the constant amplitude sawtooth-wave scanning voltage.

Figures 4, 5:
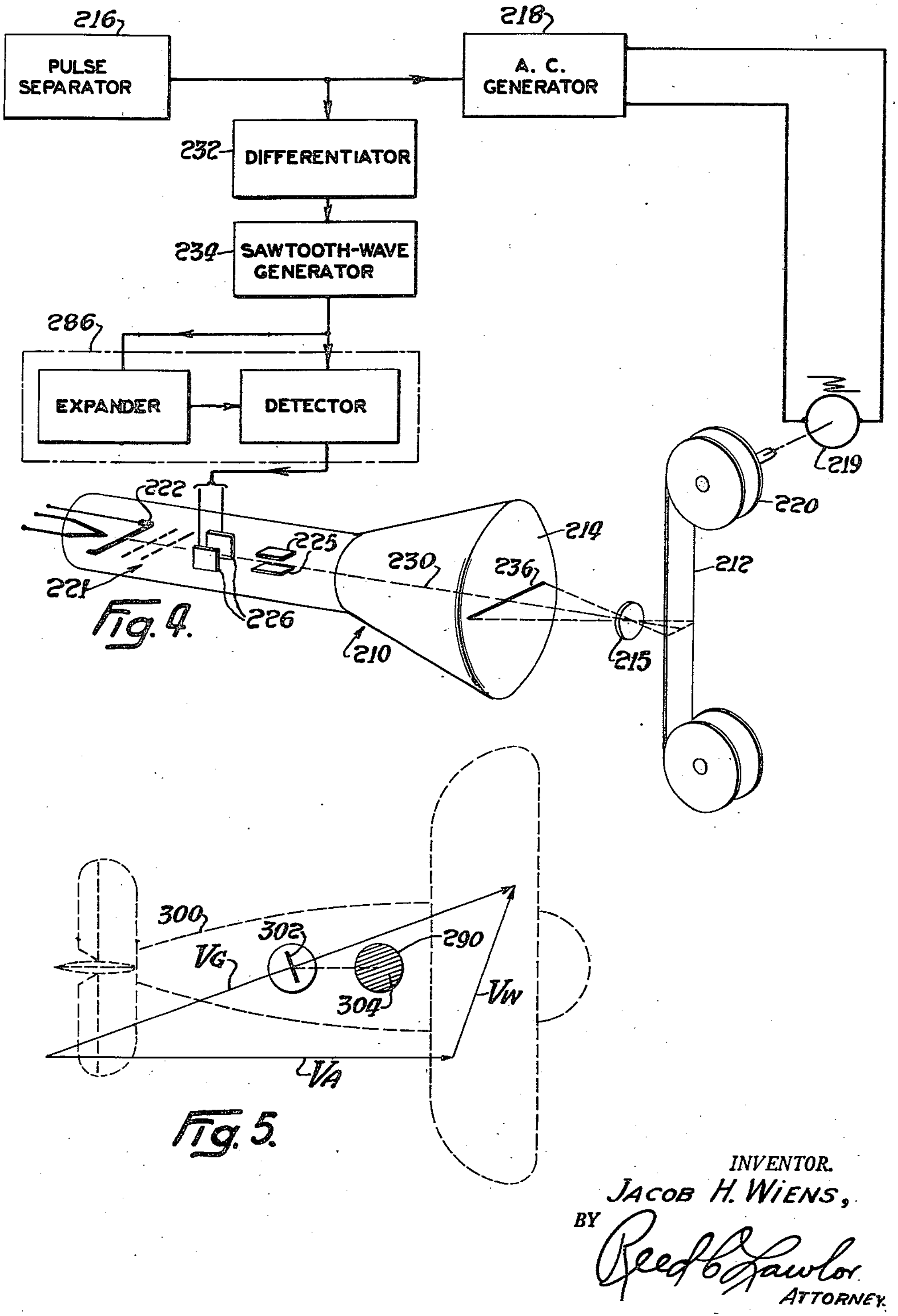
Fig. 4 is a partially schematic wiring diagram of an alternative form of a receiver.
Fig. 5 is a schematic diagram illustrating the operation of a transmitter.

In a similar manner a sawtooth-wave scanning voltage of constant amplitude is produced at the receiver 200. Thus, as indicated in Fig. 4 the output of the pulse separator 216 is applied to an AVC amplifier 286 after its passage through the differentiator 232 and the sawtooth wave generator 234 and the output of the AVC amplifier 286 is impressed on the scanning plates 226 of the cathode ray tube 210. At the same time, the square wave output of the pulse separator 216 serves to control the frequency of sinewaves generated by the sinewave generator 218 so that the synchronous motor 220 drives the film 212 at a speed proportional to the flight speed.

With the frequency of the square-wave generator varied in proportion to the flight speed in the manner above described and the amplitude of the sawtooth wave generators 144 and 234 maintained constant, a strip of the terrain of constant width is surveyed at a constant scale. The speedometer 250 employed for controlling the frequency of the square wave generator 140 may be a ground-speed meter to obtain a maximum uniformity in the scale of the record produced on the film 212. However, for many practical purposes it is sufficiently accurate to employ an air-speed meter for this purpose.

Account may be taken of the drift of an aircraft due to the cross-wind by scanning the image formed in the iconoscope 104 along a line perpendicular to the course of the aircraft rather than along a line perpendicular to the longitudinal axis of the aircraft. A system for achieving this result is illustrated schematically in Figs. 5 and 6. In this arrangement the iconoscope 104 and the lens 106 and a drift sight 290 are mounted upon a pair of gimbal rings 292 and 294. The iconoscope tube 104, the lens 106 and the drift sight 290 are arranged in a rigid housing mounted upon the inner gimbal ring 292 and the outer gimbal ring 294 is mounted for rotation in a stationary ring 296 secured to the frame of the aircraft. A semi-reflecting mirror 298 mounted between the lens 106 and the drift sight 290 serves to transmit an image of the earth to the drift sight where it may be observed by the navigator and to reflect another identical image to the screen 108 of the iconoscope 104.

As indicated in Fig. 5 the ground speed $V_G$ of the aircraft 300 is ascertained by adding the vector $V_W$ representing the wind velocity to the vector $V_A$ representing the velocity of the aircraft relative to the air. The scanning line 302 of the iconoscope tube 104 is oriented perpendicular to the course of the aircraft by rotating the scanning line to a position perpendicular to the ground speed $V_G$. This is accomplished by rotating the drift sight 290 to a position where the track of a ground object travels parallel to the lubber lines 304. With this arrangement a strip of terrain parallel to the direction of travel of the aircraft relative to the ground is reproduced on the film 212 without distortion.

It is to be noted that accurate reproduction may be achieved even though the AVC amplifier 280 is not employed. In this case, however, the width of the strip surveyed and the resolving power of the system fluctuate according to the flight speed.

Figure 6:
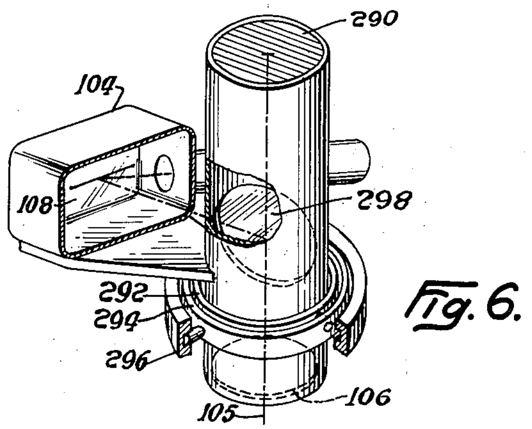
Fig. 6 is a schematic diagram of an adjustable camera mount.

With the mounting arrangement illustrated in Fig. 6 it is also possible to scan a portion of the ground offset from the track directly below the aircraft. In this case the optic axis 105 of the imaging system is rotated with the gimbals 292 and 294 until the axis points in a direction of the area to be observed, and the area is scanned by swinging the optic axis 105 in a direction transverse to the scanning line 302. This movement may be accomplished, for example, by focusing an image of the area to be observed upon the drift sight 290 and moving the drift sight relative to the image in such a way that the image of a particular object thereon travels parallel to the lubber lines. The gimbal rings 292 and 294 may be rotated in the stationary ring 296 to permit swinging the optic axis in any direction desired.

In some cases it is disadvantageous to wait for the film 212 to be developed. In such a case an image of the terrain being surveyed may be examined instantaneously by means of the reproducing system represented in Fig. 7. In this case the cathode ray tube 210 is provided with a screen 214′ comprising a layer of a long-time phosphor such as one having an image retention period of several seconds or more. To examine a portion of the area surveyed, the reproduction line 236 upon which the image of the scanning line 302 is being reproduced is periodically moved across the screen 214′ in a direction perpendicular to the scanning line and with a period comparable to the image retention period of the screen. To achieve this result the synchronous motor 220 is employed to vary the voltage impressed upon the centering plates 225 periodically in sawtooth wave fashion. Thus, one of the plates 225 may be connected to a rotatable contact arm 310 of a circular potentiometer 312, one end of which is connected to the other centering plate 225 through an auxiliary centering potentiometer 314. To facilitate varying the area covered by the image on the screen, the opposite ends of the circular potentiometer are connected to the centering potentiometer 314 through independently movable contacts. By gearing the contact arm 310 to the shaft of the synchronous motor 219, the voltage impressed upon the centering plates 225 is caused to vary in a sawtooth fashion, moving slowly in one direction and then returning quickly to its starting position. With this arrangement the high resolving power per cycle of band width of my single-line television surveying system is achieved with practically no delay in displaying the desired information to an observer.

Figures 7, 8, 9:
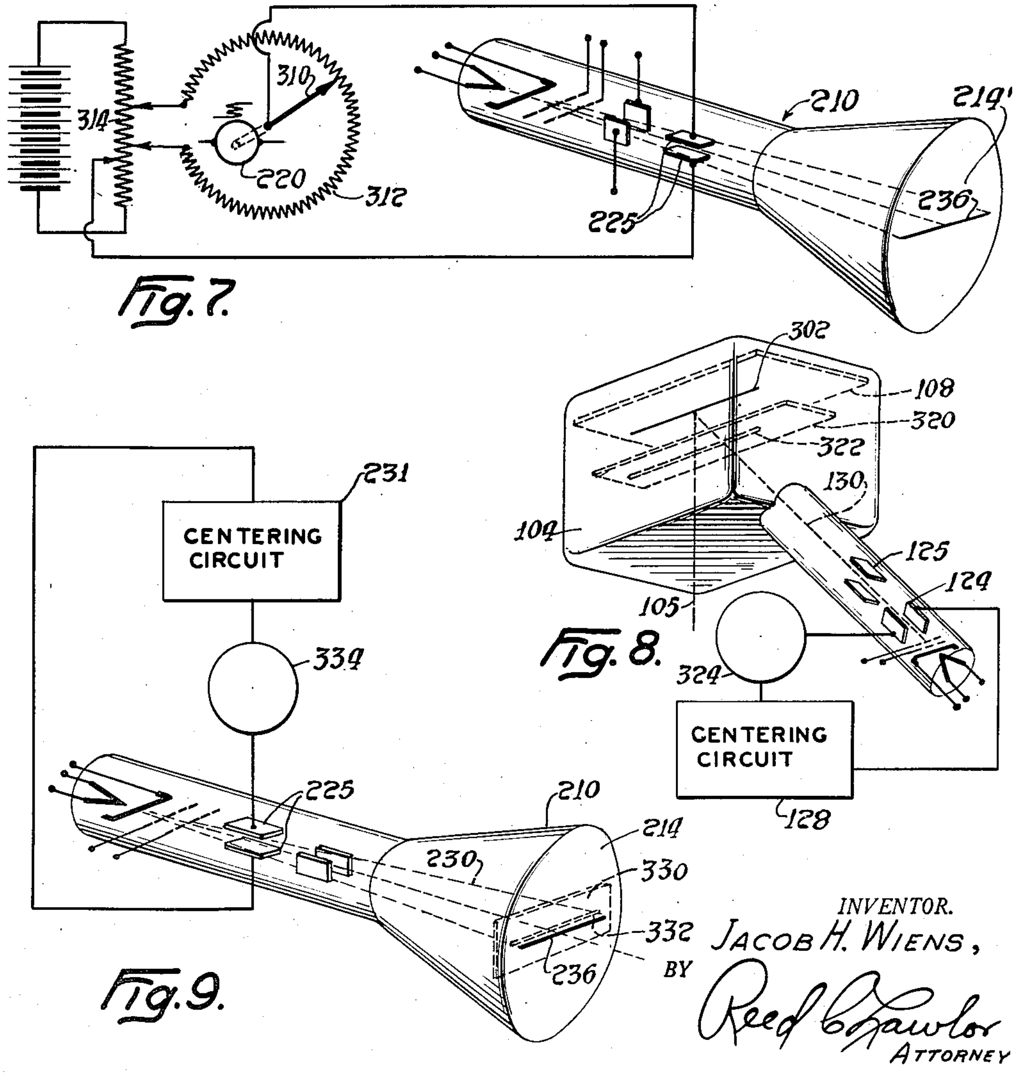
Fig. 7 is a schematic diagram of an alternative form of receiver.
Fig. 8 is a schematic diagram of a modified iconoscope of high resolving power.
Fig. 9 is a schematic diagram of a modified cathode ray tube of high resolving power.

In order to increase the resolving power of my surveying system further a window 320 having a slit 322 narrower than the electron beam 130 of the iconoscope 104 is inserted in front of and close to the screen 108 as indicated in Fig. 8, and a similar window 330 having a slit 332 narrower than the electron beam 230 is mounted in front of and close to the screen 214 of the cathode ray tube 210 as indicated in Fig. 9. In both cases the windows are made electrically conductive such as by coating with a metallic layer. The metallic layers are preferably grounded or otherwise suitably connected to discharge. In the arrangement of the iconoscope 104 illustrated in Fig. 8 the slit 322 defines the scanning line 302. The window 320 of the iconoscope 104 is rendered optically transparent such as by making it of glass. The electron beam 130, the scanning line 302, and the optic axis 105 of the iconoscope 104 all lie in the same plane.

To assure even beam intensity along the length of the slit 322 an oscillator 324 is connected in one of the leads between the centering circuit 128 and one of the centering plates 124. Likewise to assure correct beam intensity along the length of the reproduction line 236 defined by the slit 332 an oscillator 334 is connected in one of the leads between the centering circuit 231 and one of the centering plates 225. In both cases the frequency of the oscillators chosen is very high compared to the frequency of scanning to achieve the desired control of beam intensity.

From the foregoing description of the various embodiments of my invention illustrated in the drawings, it is apparent that I have provided a novel method of television surveying that possesses many advantages over other surveying systems, especially those used in aerial surveying. In the drawings my invention has been illustrated schematically only in sufficient detail to enable those skilled in the art of television and kindred arts to practice my invention. For this reason, it is to be understood that various circuit details which are normally incorporated in individual circuits of the type described to achieve the results desired have in many instances been omitted and may be readily supplied by those skilled in the art. Thus, for example, the various means for applying accelerating potentials to the electron beams employed in the apparatus described have not been disclosed in detail, since means for accelerating electron beams are well known. Also, similarly, the values of various circuit elements have not been specifically mentioned since the selection of appropriate values is well within the ability of those skilled in the art who may desire to practice my invention. Likewise, in some instances some circuit details which do not cooperate in an unusual manner with the other elements of my apparatus have not been illustrated and described since such illustration and description are not necessary to enable those skilled in the art to practice my invention. It is therefore to be understood that the circuits and the various arrangements illustrated and described may be altered in many ways by those skilled in the art without departing from the principles of my invention. For this reason, it is to be understood that my invention is not limited to the details of the specific circuits and arrangements illustrated and described but that my invention encompasses all modifications thereof which fall within the scope of the appended claims.

I claim:

1. In an aerial survey system in which terrain is surveyed from an aircraft in flight along a flight course over said terrain: means defining an image area on said aircraft; means for projecting onto said image area an areal image of the terrain relative to which the aircraft is flying whereby the image of said terrain progresses along a reference axis in said image area; means including a plurality of photo-sensitive elements for simultaneously receiving radiation of said areal image projected to various points of said image area at positions that are spaced apart along a line that extends transversely of said reference axis and for accumulating energy in accordance with the amount of radiation received at such points; means for periodically sequentially detecting energy accumulated by the respective photo-sensitive elements to produce a series of electrical picture waves, each electrical picture wave having a duration that is a substantial portion of the repetition period of such sequential detection; means for generating a carrier wave on the aircraft; means for modulating said carrier wave in accordance with the successive electrical picture waves; means for transmitting the modulated carrier wave to a point remote from the aircraft; means for receiving the modulated carrier wave at that point; and means for reproducing an image of a portion of the terrain from the received modulated wave.

2. In an aerial survey system in which terrain is surveyed from an aircraft in flight along a flight course over said terrain: a camera tube having a light-sensitive screen mounted upon the aircraft, said screen having a plurality of light-sensitive elements disposed on a scanning line thereon; optical means for focusing on said screen an image of the terrain relative to which said aircraft is flying, said image moving continuously across the scanning line on said screen during flight, said light-sensitive elements being simultaneously exposed to radiant energy received from different laterally displaced parts of said terrain as said aircraft flies over said terrain; means for repeatedly scanning said screen along said scanning line with an electron beam during flight, the duration of the scanning interval being a substantial portion of the scanning repetition period; means connected to said screen and responsive to scanning of the screen by said electron beam to form a series of electrical picture waves corresponding to the successively scanned portions of the image, each electrical picture wave having a duration about equal to said scanning interval; a radio frequency transmitter; and means for modulating the output of said transmitter in accordance with said electrical picture waves.

3. In an aerial survey system in which terrain is surveyed from an aircraft in flight along a flight course over said terrain: a camera tube having a light-sensitive screen mounted upon the aircraft, said screen having a plurality of light-sensitive elements thereon, each said element being adapted to accumulate electrical charges in an amount dependent on the amount of radiant energy impinging thereon; means for projecting an electron beam onto said screen; scanning means for repeatedly scanning said screen with said electron beam along a scanning line thereon, to repeatedly discharge electrical charges accumulated by different light-sensitive elements along said scanning line, the total scanning interval during which the scanning of all elements on said scanning line occurs in each scanning interval being a substantial portion of the scanning repetition period; optical means for focusing directly upon said screen an image of the terrain relative to which said aircraft is flying, said image moving continuously across said scanning line during flight, said light-sensitive elements on said scanning line being simultaneously exposed to radiant energy received from points in different laterally displaced strips of said terrain as said aircraft flies over said terrain whereby each element simultaneously accumulates electrical charges in accordance with the amount of radiant energy being received from such points in different laterally displaced strips of the terrain; means operated by the discharge of said charges to form a series of electrical picture waves corresponding to the scanned portions of the image, each electrical picture wave having a duration that is about equal to said scanning interval and that is a substantial portion of said scanning period; a radio frequency transmitter; and means for modulating the output of said transmitter in accordance with said electrical picture waves.

4. In an aerial survey system in which terrain is surveyed from an aircraft in flight along a flight course over said terrain: a camera tube having a light-sensitive screen mounted upon the aircraft, said screen having a plurality of light-sensitive elements thereon, each said element being adapted to accumulate electrical charges in an amount dependent on the amount of radiant energy impinging thereon; means for projecting an electron beam onto said screen; scanning means including a sawtooth-wave generator for repeatedly scanning said screen with said electron beam along a scanning line thereon, to repeatedly discharge electrical charges accumulated by different light-sensitive elements along said scanning line, the total scanning interval during which the scanning of all elements on said scanning line occurs in each scanning interval being a substantial portion of the scanning repetition period; optical means for focusing directly upon said screen an image of the terrain relative to which said aircraft is flying, said image moving continuously across said scanning line during flight, said light-sensitive elements on said scanning line being simultaneously exposed to radiant energy received from points in different laterally displaced strips of said terrain as said aircraft flies over said terrain whereby each element simultaneously accumulates electrical charges in accordance with the amount of radiant energy being received from such points in different laterally displaced strips of the terrain; means operated by the discharge of said charges to form a series of electrical picture waves corresponding to the scanned portions of the image, each electrical picture wave having a duration that is about equal to said scanning interval and that is a substantial portion of said scanning period; a radio frequency transmitter; means for modulating the output of said transmitter in accordance with said electrical picture waves; and a speedometer responsive to the flight speed of said aircraft and connected to said sawtooth-wave generator for varying the frequency of scanning in proportion to the flight speed.

5. In an aerial survey system in which terrain is surveyed from an aircraft in flight along a flight course over said terrain: a camera tube having a photo-sensitive mosaic screen mounted upon the aircraft and including means for projecting an electron beam onto said screen; first deflection control means for controlling the displacement of said beam in one direction by a fixed amount; second deflection control means for controlling the displacement of said beam in a transverse direction by a variable amount to scan said screen along a transverse scanning line having a position thereon in said one direction determined by said first deflection control means; optical means for focusing upon said screen an image of the terrain relative to which said aircraft is flying, said image moving continuously across said scanning line during flight, said screen being simultaneously exposed to radiant energy received from different laterally displaced parts of said terrain as said aircraft flies over said terrain, whereby each element of said screen on said scanning line simultaneously accumulates electrical charges in accordance with the amount of radiant energy received; a scanning circuit connected to said second deflection control means for repeatedly scanning said screen along said scanning line with said electron beam during flight, the duration of the scanning interval being a substantial portion of the scanning period; means connected to said screen to form a series of electrical picture waves corresponding to successively scanned segments of the image tion about equal to said scanning interval; a radio fre- of said terrain, each electrical picture wave having a dura- quency transmitter; and means for modulating the output of said transmitter in accordance with said electrical picture waves.

6. In an aerial survey system in which terrain is surveyed from an aircraft in flight along a flight course over said terrain: a camera tube having a photo-sensitive mosaic screen mounted upon the aircraft and including means for projecting an electron beam onto said screen; first deflection control means for controlling the displacement of said beam in one direction by a fixed amount; second deflection control means for controlling the displacement of said beam in a transverse direction by a variable amount to scan said screen along a transverse scanning line having a position thereon in said one direction determined by said first deflection control means; optical means for focusing upon said screen an image of the terrain relative to which said aircraft is flying, said image moving continuously across said scanning line during flight, said screen being simultaneously exposed to radiant energy received from different laterally displaced parts of said terrain as said aircraft flies over said terrain, whereby each element of said screen on said scanning line simultaneously accumulates electrical charges in accordance with the amount of radiant energy received; scanning means including a sawtooth-wave generator connected to said second deflection control means for repeatedly scanning said screen during flight by causing said electron beam to travel from a starting point across said screen relatively slowly in one direction and to return relatively quickly to said starting point; a speedometer responsive to the flight speed of said aircraft; means connected to said scanning means and controlled by said speedometer for varying the frequency of scanning in proportion to the flight speed; means connected to said screen and responsive to scanning of the screen by said electron beam to form a series of electrical picture waves corresponding to successively scanned segments of the image of said terrain, each electrical picture wave having a duration about equal to said scanning interval; a radio frequency transmitter; and means for modulating the output of said transmitter in accordance with said electrical picture waves.

7. In an aerial survey system in which terrain is surveyed from an aircraft in flight along a flight course over said terrain: a speedometer responsive to flight speed; a pulse generator controlled by said speedometer for generating regularly recurring control pulses of short duration compared with the period of the pulses, at a variable frequency that varies in proportion to the flight speed; a scanner carried by said aircraft for producing a series of picture waves corresponding to successive segments of the terrain extending transversely of said flight course, successive picture waves being separated by blank intervals that occur at the times that said control pulses are generated, said scanner including means controlled by said pulse generator and operating at a frequency proportional to said variable frequency for producing such picture waves at a frequency proportional to the flight speed; a radio transmitter carried by said aircraft and adapted to modulate a transmitted radio wave in accordance with said picture waves and in accordance with said control pulses, the modulation by the control pulses and the modulation by the picture waves occurring alternately at different times; a radio receiver remote from said aircraft for receiving said modulated radio wave; and an image reproducing device including driving means for moving a strip of recording medium past an image reproducing means, said image reproducing means being controlled by said picture waves to produce a line image of each segment of said terrain across said strip as each said segment of the terrain is scanned; said driving means being controlled by the parts of the received radio waves that are modulated by said control pulses for driving said strip past said reproducing means at a speed proportional to said variable frequency, whereby the spacing of scanned segments on the terrain and the spacing of reproduced pictures on said strip are substantially independent of variations in flight speed.

8. In an aerial survey system in which terrain is surveyed from an aircraft in flight along a flight course over said terrain: photosensitive means carried by said aircraft, means for substantially continuously and simultaneously applying radiation to a line of receiving points on said photosensitive means from corresponding points on said terrain that are spaced apart transversely of said flight course, said photosensitive means accumulating amounts of energy in accordance with the amount of radiation received at the respective receiving points, and means for periodically sequentially scanning said line of receiving points for detecting energy accumulated with respect to the various receiving points to produce a series of electrical picture waves, each electrical picture wave having a duration that is a substantial portion of the repetition period of such sequential detection.

(References on following page)

References Cited in the file of this patent

UNITED STATES PATENTS

| | | |
|---|---|---|
| 2,294,114 | Graham | Aug. 25, 1942 |
| 2,315,621 | Ives | Apr. 6, 1943 |
| 2,401,441 | Tolson et al. | June 4, 1946 |
| 2,413,349 | Hancock, Jr. et al. | Dec. 31, 1946 |
| 2,415,981 | Wolff | Feb. 18, 1947 |
| 2,419,024 | Iams | Apr. 15, 1947 |
| 2,458,654 | Southworth | Jan. 11, 1949 |
| 2,480,868 | Marshall | Sept. 6, 1949 |
| 2,485,556 | Bion | Oct. 25, 1949 |
| 2,495,652 | Coburn | June 24, 1950 |
| 2,637,022 | De France | Apr. 28, 1953 |
| 2,645,971 | Herbst | July 21, 1953 |
| 2,709,716 | Haller | May 31, 1955 |